H. H. BENNETT.
DRILL.
APPLICATION FILED MAR. 16, 1911.

1,000,067.

Patented Aug. 8, 1911.

Witnesses
Victor E. Jullien
George W. Johnson.

Inventor
Harrey Haas Bennett
by James W. See
Attorney

UNITED STATES PATENT OFFICE.

HARREY HAAS BENNETT, OF ROCKFORD, ILLINOIS, ASSIGNOR OF ONE-HALF TO PAUL C. SEEGMUELLER, OF MOLINE, ILLINOIS.

DRILL.

1,000,067.  Specification of Letters Patent.  Patented Aug. 8, 1911.

Application filed March 16, 1911. Serial No. 614,775.

*To all whom it may concern:*

Be it known that I, HARREY HAAS BENNETT, a citizen of the United States, residing at Rockford, Winnebago county, Illinois, have invented certain new and useful Improvements in Drills, of which the following is a specification.

This invention, pertaining to improvements in drills, will be readily understood from the following description taken in connection with the accompanying drawing in which:—

Figure 2:
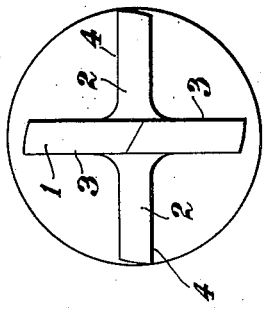
Figure 1:
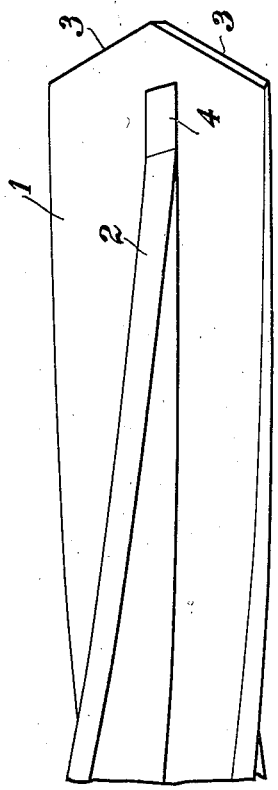

Figure 1 is a side elevation: and Fig. 2, an end elevation of a drill exemplifying my present invention.

In the drawing:—1, indicates a flat bar forming a flat drill having a width less than the diameter of the hole to be produced, the drawing illustrating the bar as having a twist, which is the preferred construction: 2, a pair of longitudinal ribs projecting centrally from the opposite sides of drill 1, the ends of ribs 2 being beveled in drill form, the diameter across ribs 2 being greater than the diameter across drill 1, and the cutting ends of ribs 2 being some distance in retreat of the cutting end of drill 1, ribs 2 being illustrated as having a twist similar to drill 1: 3, the cutting edges of drill 1: and 4, the cutting edges of ribs 2.

The edges of drill 1 and of ribs 2 are formed with the clearance usual in drills. The diameter across ribs 4 is to be that of the hole to be produced.

In using the drill, drill 1 drills its hole of a size less than that to be ultimately produced and the cutting edges of ribs 2 follow in enlarging the hole, a counter bored hole being produced as the work progresses, and the complete hole, when drilled through a piece of work, having the diameter due to ribs 2. The heavy advance work of drilling is done by drill 1, while the lighter and sizing duty is performed by ribs 2, and by reason of this division of duty there results a breaking of the chips which facilitates clearing as the work progresses. The division of the duty between what virtually constitutes two drills working simultaneously imposes a torsional strain upon each individual drill much less than would be imposed upon a single drill producing the same diameter of the hole in the same material, and the integrally formed multiple drill possesses superior bodily strength. While the idea may be carried further by increasing the number of drills embodied in the integral structure, each drill having its own individual diameter, the structure illustrated will be found preferable, by reason of simplicity and ease of manufacture and ease of sharpening.

I claim:—

1. A drill comprising, a flat bar having cutting edges at its end, and ribs projecting from the sides of said bar and having cutting edges at their ends, the cutting edges of the bar being in advance of the cutting edges of the ribs, and the diameter across the bar being less than the diameter across the ribs, combined substantially as set forth.

2. A drill comprising, a flat bar having cutting edges at its end, ribs projecting from the sides of said bar and having cutting edges at their ends, the cutting edges of the bar being in advance of the cutting edges of the ribs, and the diameter across the bar being less than the diameter across the ribs, and said bar and ribs being provided with a longitudinal twist, combined substantially as set forth.

HARREY HAAS BENNETT.

Witnesses:
GEORGE J. JOHNSON,
E. ARTHUR ANDERSON.